United States Patent Office 2,963,461
Patented Dec. 6, 1960

2,963,461

POLYVINYL ALCOHOL RESIN PLASTICIZED WITH ETHYL ACID PHTHALATE

Irving Pockel, Cambridge, Mass., assignor to Cambridge Industries Company, Cambridge, Mass., a corporation of Massachusetts No Drawing. Filed May 20, 1953, Ser. No. 356,313

1 Claim. (Cl. 260—31.8)

The present invention relates to plasticized polyvinyl alcohol compositions and plasticizers therefor, in which the polyvinyl alcohol composition exhibits an improved resistance to the action of water, organic solvents, greases, fats, asphalt, which is impermeable to the passage of gases therethrough, and which is unaffected by changes in the humidity of the surrounding atmosphere. Particularly, the invention relates to the plasticization of polyvinyl alcohol compositions with plasticizers comprising the acid esters of organic polycarboxylic acids, these converted into an ammonium or organic amine salt to provide an unexpected compatibility and to impart softness, flexibility, high gloss and clarity to the polyvinyl alcohol cast, extruded, molded or coated composition.

The problem of plasticizing polyvinyl alcohol compositions has been well recognized in the prior art and the plasticized products produced have suffered from the inherent defect of the water solubility of the available plasticizers for the polyvinyl alcohol. Prior proposals in the art have been directed to the incorporation of insolubilizing materials to react, chemically and physically with the hydrophilic polyvinyl alcohol resin, but no method could insolubilize the water soluble plasticizers.

The products which have been found to be compatible and most effective in imparting softness and flexibility to polyvinyl alcohol resins are some of the high boiling point, water soluble organic compounds containing hydroxyl, amide and amino groups, such as glycerine, ethylene glycol, ethanol acetamide and triethanolamine hydrochloride. Of these glycerine has been extensively used.

Although glycerine is said to be a plasticizer for polyvinyl alcohol, it may easily be shown that all of the plasticizing action is due to the water which the glycerine holds in the composition. By driving off the water by heating or storing in a dry atmosphere, polyvinyl alcohol compositions plasticized with glycerine will become hard and brittle. In contrast, the acid esters described in this application are in themselves true plasticizers for the polyvinyl alcohol and yield compounds that are not affected by elevated temperatures or low humidity.

Other than the polyester type plasticizers described in U.S. Patent 2,611,756, there are no other known water-insoluble plasticizers that can meet the strict U.S. requirements for the plasticized resin and can be compatible with polyvinyl alcohol. In fact, the polyester plasticizers described in U.S. Patent 2,611,756 are not compatible with the fully hydrolyzed grades of polyvinyl alcohol but only with those grades that contain more than 33% of the original polyvinyl acetate in combination.

Although several methods have been developed for water-proofing the polyvinyl alcohol resin (action of heat, incorporation of dimethylol urea or stearato chromic chloride) it was impossible to waterproof the glycerine or other water soluble softener used to flexibilize the resin. A further object of the invention is the embodiment of a water insoluble plasticizer in polyvinyl alcohol compositions.

An object of the invention is to provide monomeric acid esters of organic polybasic acids particularly useful as plasticizers for fully hydrolyzed polyvinyl alcohol to improve the softness, flexibility, water resistance and impermeability of the composition in the form of a coating, casting, filament or molding.

A further object of the invention is to provide improved aqueous dispersions of fully hydrolyzed polyvinyl alcohol in which there is incorporated a water insoluble acid ester of an organic polybasic acid as a plasticizer in the presence of ammonia or an organic amine to provide an improved water base coating composition.

Other and further objects of the present invention will appear from the more detailed description set forth below, it being understood that such detailed description is given by way of illustration and explanation only and not by way of limitation, since various changes therein may be made by those skilled in the art without departing from the scope and spirit of the present invention.

Briefly stated, the foregoing objects are realized according to the present invention by the preparation and incorporation into a polyvinyl alcohol composition of the acid ester of organic polybasic acids such as phthalic, succinic, maleic, adipic, azelaic, sebacic, diglycolic, tetrachlorophthalic, isophthalic, terephthalic and oxalic acids and the like, with organic hydroxy compounds such as ethylene glycol, diethylene glycol, triethylene glycol, tetraethylene glycol, hexaethylene glycol, glycerine, pentaerythritol, monoethers of the various glycols, propylene glycol, dipropylene glycol, octylene glycol, hexylene glycol, butylene glycol and amylene glycol, hexanediol-2,5, octanediol and the like. Preferred products, however, are exemplified in the following examples:

*Example 1*

2227 lbs. of phthalic anhydride and 761 lbs. of a proprietary alcohol consisting of: 87.7% ethyl alcohol, 4.6% water, 0.9% ethyl acetate, 0.9% methyl isobutyl ketone and 0.9% high octane gasoline, were mixed together and allowed to stand at room temperature for several days until a chemical reaction had taken place between the phthalic anhydride and the alcohols to yield a mixture of the acid esters of phthalic acid and methyl and ethyl alcohol. 5 lbs. of this acid ester mixture were added to 100 lbs. of a 10% aqueous solution of completely hydrolyzed polyvinyl alcohol resin (E. I. du Pont de Nemours Co. Elvanol 90–25). The milky dispersion is cleared by the addition of 28% ammonia water which solubilizes the acid esters. Films cast from this solution were soft, clear, glossy, flexible, and very tough.

*Example 2*

800 lbs. of a polyethylene glycol having an average molecular weight of 300 (Dow Chemical Co. Polyglycol E300) and 658 lbs. of phthalic anhydride were heated in a stainless steel kettle to 400° F. and held at that temperature for 20 minutes. The water white syrup-like liquid obtained had essentially the following chemical structure:

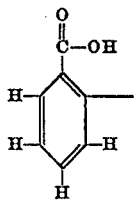
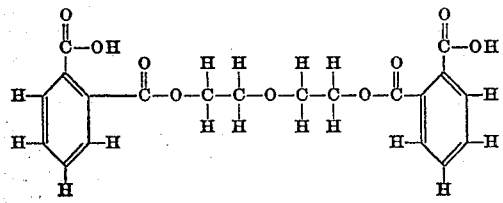

100 lbs. of the above acid ester was mixed with 25 lbs. of 28% ammonia water and 50 lbs. of water. This mixture was added to 1000 lbs. of a 10% aqueous solution of fully hydrolyzed polyvinyl alcohol (E. I. du Pont de Nemours Co. Elvanol 90–25). Films cast from this water clear solution were soft, glossy, flexible and very tough.

*Example 3*

2000 lbs. of phthalic anhydride and 752 lbs. of diethylene glycol were placed in a stainless steel kettle and heated to 395° F. and held at that temperature for 10 minutes. A soft, water clear resin-like material was obtained which had essentially the following chemical structure:

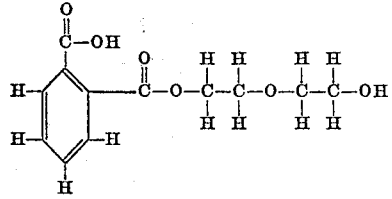

10 lbs. of this acid ester was warmed up and mixed with 10 lbs. of water and sufficient 28% ammonia water to yield a clear solution. This mixture was then added to 100 lbs. of 10% aqueous solution of a 99% hydrolyzed polyvinyl alcohol resin (E. I. du Pont de Nemours Co. Elvanol 72–51). Additional 28% ammonia water was added until the solution was water clear. Films cast from this solution were clear, glossy and hard.

*Example 4*

2000 lbs. of phthalic anhydride and 1433 lbs. of diethylene glycol were placed in a stainless steel kettle and heated to 383° F. and held at this temperature for 5 minutes. On cooling, a water clear syrup-like liquid was obtained which had essentially the following chemical composition:

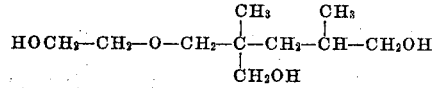

10 lbs. of this acid ester was mixed with 100 lbs. of a 10% aqueous solution of a 99% hydrolyzed polyvinyl alcohol resin (E. I. du Pont de Nemours & Co. Elvanol 72–51) and sufficient 28% ammonia water added to yield a water clear solution. Films cast from this solution were clear and flexible.

*Example 5*

74 lbs. of phthalic anhydride and 103 lbs. of a triol having the following chemical structure:

$$HOCH_2-CH_2-O-CH_2-\underset{\underset{CH_2OH}{|}}{\overset{\overset{CH_3}{|}}{C}}-CH_2-\overset{\overset{CH_3}{|}}{CH}-CH_2OH$$

were placed in a stainless steel kettle and heated to 400° F. and held at that temperature for 5 minutes. On cooling, a water clear, syrup-like material was obtained which consisted essentially of a mixture of the isomeric acid esters of phthalic acid and the triol. 10 lbs. of these mixed acid esters were stirred into 100 lbs. of a 10% aqueous solution of a 99% hydrolyzed polyvinyl alcohol resin (E. I. du Pont de Nemours & Co. Elvanol 72–51). Sufficient 28% ammonia water was then added to yield a water clear solution. Films cast from this solution were soft, clear and flexible.

*Example 6*

330 lbs. of C.P. glycerine and 980 lbs. of phthalic anhydride were placed in a stainless steel container, heated to 370° F. and allowed to cool. The water clear resinous-like material obtained had essentially the following chemical structure:

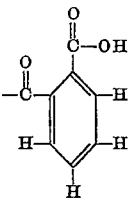
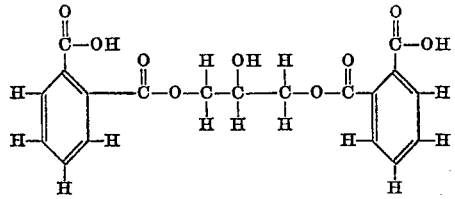

10 lbs. of this acid ester was heated to 175° F. and mixed with 10 lbs. of water and sufficient 28% ammonia water to yield a water clear solution. This solution was added to 100 lbs. of a 10% aqueous solution of a fully hydrolyzed polyvinyl alcohol resin (E. I. du Pont de Nemours & Co. Elvanol 90–25). Sufficient additional 28% ammonia water was then added to yield a water clear solution. Films cast from this solution were clear, hard and glossy.

*Example 7*

56 lbs. of tetrachloro phthalic anhydride and 32 lbs. of the proprietary alcohol used in Example 1 were mixed together and allowed to stand at room temperature for 3 days with occasional stirring; at this time a water clear solution was obtained consisting essentially of a 75% solution in the proprietary alcohol of the mixed acid esters of tetrachloro phthalic acid and methyl and ethyl alcohol. 9 lbs. of this solution of acid esters was mixed with 10 lbs. of water and sufficient 28% ammonia water to yield a water clear solution. To this was added 100 lbs. of a 10% aqueous solution of a fully hydrolyzed polyvinyl alcohol resin (E. I. du Pont de Nemours & Co. Elvanol 90–25) and sufficient 28% ammonia water to yield a water clear solution. Films cast from this solution were clear, glossy, flexible and hard.

*Example 8*

700 lbs. of succinic anhydride and 336 lbs. of anhydrous ethyl alcohol are mixed together and allowed to stand for 45 days at room temperature (18 to 25° C.). A chemical reaction takes place to yield substantially pure ethyl acid succinate as indicated by the physical constants of the compound. 5 lbs. of this acid ester are added to 150 lbs. of a 10% aqueous solution of a completely hydrolyzed polyvinyl alcohol resin (E. I. du Pont de Nemours Co. Elvanol 90–25). The milky dispersion is cleared by the addition of 28% ammonia water which solubilizes the acid ester. Films cast from this solution were soft, clear, glossy, flexible and very tough.

In each of the above examples the polyvinyl alcohol resin may be derived from partially or completely hydrolyzed polyvinyl acetate and good results have been obtained with such resins containing as much as 20 to 25% of unhydrolyzed acetate groups in the resin.

It has further been found that filaments can be extruded using the plasticized compositions of the above examples to provide clear, glossy and hard water resistant filaments.

In the above examples, the particular plasticizer composition is added to the aqueous dispersion of the polyvinyl alcohol resin and the dispersion is clarified to form the water clear solution by the formation of the organic water soluble amine salt or ammonium salt from the addition of a solubilized amine or ammonia, the amine or ammonia being added in slight excess. The nitrogen salt as in the examples or as indicated below may be formed from the acid ester plasticizer of the examples by the addition of the amine or ammonia compound to the plasticizer and then the nitrogen salt of the half ester can be added to an aqueous dispersion of the polyvinyl alcohol resin or to the powdered substantially dry resin and the plasticization is accomplished by adding a slight excess amount of the particular amine from which the salt is derived or of aqueous soluble amines or of aqueous ammonia. The proportions are substantially along the lines as indicated in the above examples.

Amines which have been solubilized in water and which react with the carboxyl group of the ester in the plasticized polyvinyl alcohol composition of the invention include morpholine, piperidine, pyridine, mono-, di-, and tri-methyl amines, the corresponding ethyl, propyl and butyl amines, mono-, di-, and tri-ethanol amines, the corresponding alkylol amines up to 4 or 5 carbon atoms, pyridines and substituted pyridines which are water soluble, water soluble guanidine, dicyandiamide and corresponding thio derivatives, cyclohexylamine, and such cyclo-aliphatic imines from ethylene amine to butylene amine and the like.

The compatibility of the so-plasticized composition in the presence of poly functional amines to form the salts of the half ester also facilitates the incorporation of other resinous ingredients for the purpose of providing further beneficial physical and chemical characteristics of the plasticized films obtained on casting or by molding. Melamine formaldehyde condensation products may be incorporated into the plasticized composition as also may be "A-stage" phenolic condensation products and urea, guanidine, thioguanidine and thiourea condensation products.

Also, the compositions of the invention are compatible with and may be advantageously mixed with partly hydrolyzed polyamide resin compositions and with polyamide compositions of intermediate molecular weight. Further the cast film of the present composition may be additionally coated with the above resins or may be laminated to sheets of the above resin compositions.

The self-sustaining film produced by casting or extruding of the composition of the present invention are grease resistant, transparent, and of excellent water resistance. These films are well suited for preparing food packages or for providing barrier coats in packaging which are impermeable to gases and unaffected by changes in the relative humidity of the atmosphere. As explained above, the flexibility of the film or coating may be controlled in accordance with the new plasticizers set forth in the present application to provide a layer of wide utility in heat sealing, packaging and coating operations. A coating of paraffin wax at the edges of the sheet to be heat sealed promotes such sealing and this may also be effected by the use of other thermoplastic coatings.

Although it is preferred to conduct the plasticizing step in the aqueous solution or dispersion of the completely hydrolyzed polyvinyl alcohol, the plasticizer may be incorporated with the polyvinyl alcohol in the dry state and this is of advantage in preparing the mix for extrusion molding.

Having thus disclosed the invention, what is claimed is:

A composition of matter comprising essentially hydrolyzed polyvinyl acetate containing up to 25% of unhydrolyzed acetate groups plasticized by, as sole plasticizer, ethyl acid phthalate.

References Cited in the file of this patent

UNITED STATES PATENTS

| | | |
|---|---|---|
| 2,075,107 | Frazier | Mar. 30, 1937 |
| 2,284,100 | Meigs | May 26, 1942 |
| 2,399,401 | Sonnichsen et al. | Apr. 30, 1946 |
| 2,611,756 | Pockel | Sept. 23, 1952 |